United States Patent [19]

Welch

[11] 4,090,572

[45] May 23, 1978

[54] METHOD AND APPARATUS FOR LASER TREATMENT OF GEOLOGICAL FORMATIONS

[75] Inventor: Albert B. Welch, Dallas, Tex.

[73] Assignee: Nygaard-Welch-Rushing Partnership, Dallas, Tex.

[21] Appl. No.: 720,361

[22] Filed: Sep. 3, 1976

[51] Int. Cl.² .............................................. E21B 7/00
[52] U.S. Cl. ................................. 175/16; 219/121 L; 299/14; 350/55; 350/96.10; 350/179
[58] Field of Search ...................... 175/16, 11; 299/14; 166/248; 350/319, 55, 179, 96 R; 219/121 LM, 121 L; 331/DIG. 1

[56] References Cited

U.S. PATENT DOCUMENTS

| 2,730,004 | 1/1956 | Badger et al. | 350/55 UX |
| 3,493,060 | 2/1970 | Van Dyk | 299/14 |
| 3,558,891 | 1/1971 | Kaiser | 350/179 X |
| 3,598,472 | 8/1971 | Kaiser | 350/179 |
| 3,693,718 | 9/1972 | Stout | 175/16 X |
| 3,977,478 | 8/1976 | Shuck | 175/16 |
| 3,998,281 | 12/1976 | Salisbury | 175/16 |

*Primary Examiner*—Ernest R. Purser
*Assistant Examiner*—William F. Pate, III
*Attorney, Agent, or Firm*—Pennie & Edmonds

[57] ABSTRACT

A method and apparatus are disclosed for drilling gas, oil or geothermal wells in geological formations and for "fracing" the pay zones of such wells to increase recovery, using a laser beam projected into the well bore along a beam guide so as to make available laser energy adequate to melt or vaporize the formation under down-hole conditions. Fluid circulation is established via the beam guide to keep the beam path adequately free of contaminants to permit drilling. A novel orifice window is provided to allow transmitting the high energy beam from the surface into a high-pressure, down-hole environment.

38 Claims, 16 Drawing Figures

METHOD AND APPARATUS FOR LASER TREATMENT OF GEOLOGICAL FORMATIONS

BACKGROUND OF THE INVENTION

The present invention relates to a method and apparatus including a high power laser for drilling gas, oil or geothermal wells in geological formations, and for fracturing the pay zones of such wells to increase recovery of oil, gas or geothermal energy.

The use of down-hole lasers (i.e. those lowered into the bore hole in proximity to the surface being drilled) for drilling through and recovering minerals from subterranean formations has been proposed, for example, in U.S. Pat. Nos. 3,871,485 and 3,882,945 to Keenen, and U.S. Pat. No. 3,461,964 to Venghiattis. However, the systems disclosed in these patents are inherently limited and impractical because adequate power cannot be obtained from lasers small enough to fit down the hole.

It has also been proposed, in the U.S. Pat. Nos. 3,493,060 to Van Dyk and 3,693,718 to Stout, to use a laser at the surface to penetrate through a mineral bearing formation or to form a subterranean cavity at the bottom of a bore hole. In those systems, a laser beam is directed down the bore hole to the bottom, where it drills by vaporizing or melting the irradiated formation. The depths to which such systems can operate, however, are extremely limited since the vapors and debris produced by drilling mix with the air or other gaseous medium in the bore hole, scattering and dissipating most of the beam energy before it can reach the rock to be drilled. No satisfactory method has been suggested for maintaining the beam path adequately free of contaminants and debris produced by the drilling itself to insure that the necessary levels of energy continue to reach the drilling site.

Moreover, there are no provisions in the proposed systems for guiding the beam so as to obtain adequate energy for drilling at the hole bottom. Since a beam from a high power laser undergoes significant divergence due to a number of factors, including non-uniform heating of the medium in its path, thermal distortion of the laser medium and optics and diffraction, beam spreading imposes an additional significant limitation on the operating depths of such systems.

Still a further drawback of proposed laser drilling methods renders them inadequate for any except the shallowest holes because they fail to suggest any way of isolating the high pressure down-hole environment from atmospheric pressure at the surface, while at the same time allowing transmission of the laser beam through the pressure barrier.

Fracing is a method of increasing the permeability and thus the flow rate of oil or gas from the producing formation into the bore holes so that it may be removed from the well. The most common type of fracing in use during the past decade has been hydraulic fracing, involving pumping large volumes of viscous fluid downhole at a rate fast enough to fracture the formation along planes dictated by its natural weaknesses. The hydraulic fracing fluid commonly contains particulate matter, called "proppants" carried by the fluid through the fracture areas to prop the newly made fractures open permanently after the fluid pressure subsides. Explosive fracing has also been used to some extent although significant problems have been encountered in achieving reliable detonation in the very narrow propagation diameters required for this purpose. While socalled "bore-shots", or explosions of concentrated volumes of explosives in the bore hole proper, increase permeability somewhat simply by increasing the amount of fresh surface area available, they are generally not as effective as formation fracturing, which seeks to increase the permeability of the formation throughout a larger volume, extending far back from the bore hole.

All fracing methods previously in use are incapable of creating new fissures in the formation except along planes defined by the fault structure of the formation itself. This natural fault structure often bears no relation to the specific planes and directions where fracing would be most effective. Accordingly, it would be a significant breakthrough to be able to achieve fracing along directions from the bore hole that could be specifically related to the geology of the individual formation.

SUMMARY OF THE INVENTION

In accordance with the invention a gas or oil well is drilled by a high-energy beam which is projected along a beam guide tube disposed in the well bore to progressively drill through the formation underlying the bore by melting or vaporizing the rock in its path. A flow of gas transparent to the beam is introduced under pressure into the upper end of the tube so that it flows downwardly and then up the annular space between the tube and the bore hole. This maintains the path of the beam adequately free of the energy dissipating vapor and debris produced by drilling, to assure coupling of substantial beam energy to the formation. The drilling debris is removed from the well by the upward return gas flow. The gas may be introduced into the well at sufficient pressure to offset the overburden pressure of the formation, thus serving to prevent caving in of the well bore without the need for well casings.

The tube, including the gas contained in it, form a beam guide in accordance with preferred embodiments of the invention which continuously confines the beam and guides it through curvatures in the tube. This makes it possible to attain drilling depths comparable to or greater than those achieved by conventional rotary drilling methods, without the drawbacks inherent in such methods. The beam guide is formed by introducing a substantially laminar flow of high pressure gas into the tube at a lower temperature than that of the tube wall. As the cold gas flows through the tube, its peripheral layer is immediately heated by thermal conduction from the wall and its density and hence index of refraction decreases below that of the cooler gas at the center. A radially decreasing index of refraction distribution is thus established across the gas column so that the beam is confined and guided along the tube axis. Should the gas tend to be a homogenous temperature distribution through absorption of beam energy or the like during drilling, it may periodically be purged from the tube by a brief high velocity charge of fresh cold gas restoring its ability to confine and guide the beam.

To augment debris removal, additional volumes of air or comparable gas may be introduced into the well through a second outer tube disposed concentrically about the beam guide tube. The gas flowing through the outer tube may be heated so that it will in turn heat the wall of the beam guide tube, enhancing its ability to maintain the desired temperature profile.

The beam of the laser may be transmitted from the surface region of low gas pressure into the high pressure environment of the well bore through an orifice window, including focusing optics disposed in the path of the beam for focusing it to a spot at a small diameter orifice formed in the wall of a chamber containing the high pressure gas. The beam emerging from the orifice is recollimated by collimating optics disposed in the high pressure chamber, and directed by reflector optics into the beam guide tube. Because the collimated laser beam can be focused to an extremely small spot, the window is capable of containing gas at pressures of several hundred atmospheres with only negligible gas leakage through the corresponding sized orifice.

"Fracing" of the pay zone is effected by a multifaceted reflector disposed down-hole in the path of the beam. The facets of the reflector are arranged to divide the incident vertical beam into a plurality of lateral beams, each for drilling a lateral hole through the pay zone. By this means, the azimuth and elevation of each lateral hole and hence the pattern of the resulting fractures can be tailored to the specific formation to maximize recovery of oil or gas.

The pressurized cold gas discharging from the beam guide tube flows into the holes bored by the individual reflected beams, forcing the molten rock and vapor produced by drilling into the surrounding rock and thereby assuring that adequate beam energy reaches the rock surface being drilled. Because the flowing gas tends to a radially increasing temperature distribution as it flows from the beam guide into the newly formed lateral bores, it is believed that spreading of the beams in those bores is minimized and the range of the fracing may thus be significantly enhanced. As in well drilling, this gas may periodically be purged from the well and fresh cold gas injected through the beam guide tube to maintain the desired temperature profiles in the lateral holes. The beam guides formed in this manner continuously confine the beams and extend the depth of penetration well beyond the nominal diffraction limit.

DESCRIPTION OF THE DRAWINGS

Other objects, features and advantages of the present invention will be apparent from the following description of specific preferred embodiments thereof with reference to the accompanying drawings in which:

FIG. 3a is a sectional view taken on line A—A of FIG. 3;

DETAILED DESCRIPTION OF PREFERRED EMBODIMENTS

Figures 1, 2:
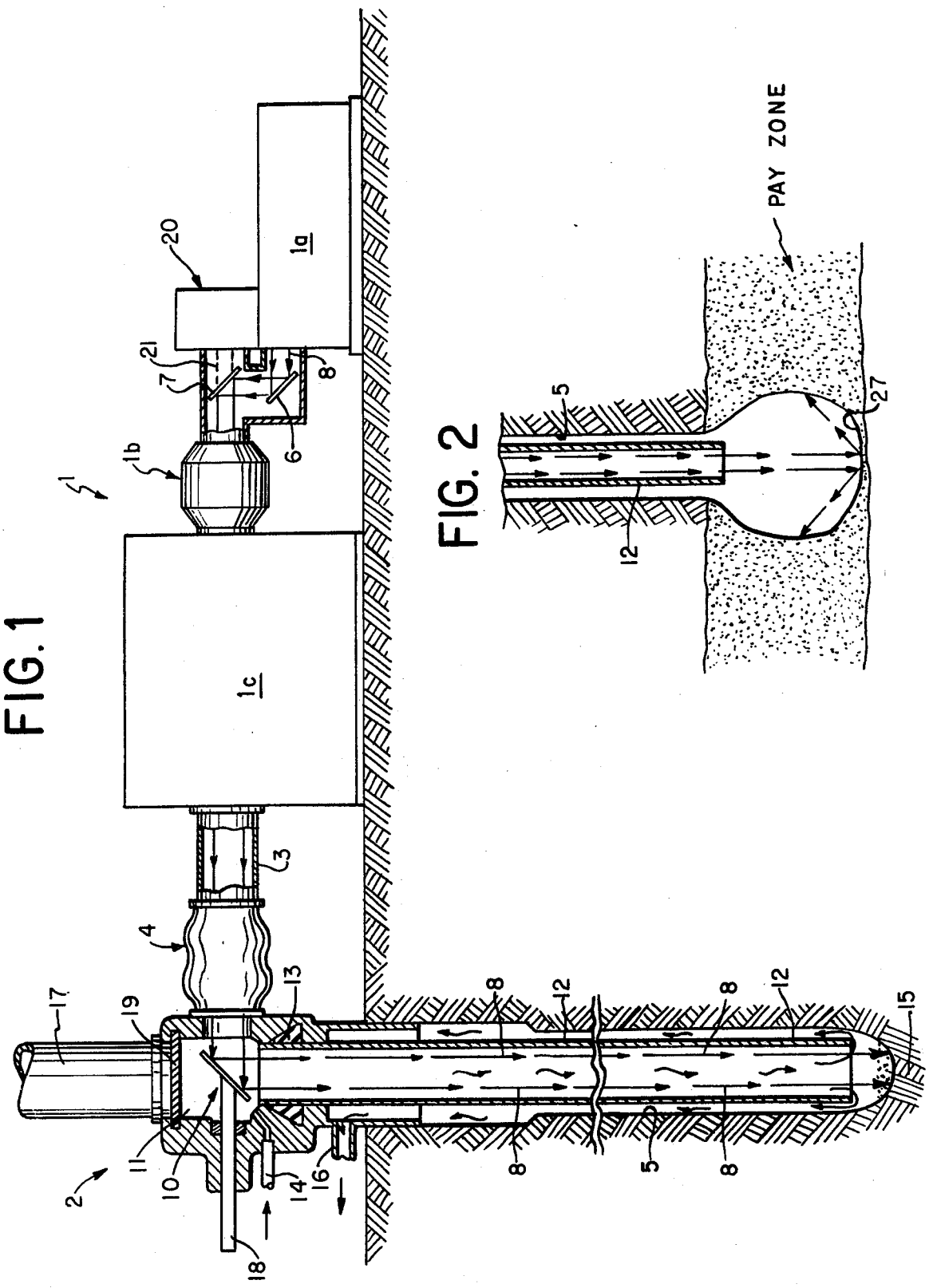
FIG. 1 is a schematic view illustrating a laser drilling apparatus in accordance with the invention.
FIG. 2 shows a cavity formed in the pay zone of a well for increasing recovery of minerals therefrom by the laser drilling apparatus of the invention.

Referring now to the drawings, the drilling apparatus of the invention shown in FIG. 1 includes a high power laser 1 disposed on the surface of the earth formation near the location of the well bore. The laser 1 may be of any design capable of producing a beam of sufficient energy to penetrate through a geological formation by progressively vaporizing the rock in its path. For example, carbon dioxide, oscillator-amplifier laser devices in which a beam from a relatively low power oscillator laser is amplified by an electric discharge or combustion driven laser, are particularly suitable for drilling applications because of the high power outputs and efficiencies obtainable in such systems. One design of such a laser device with adequate power output for drilling which uses an electric discharge, closed cycle, carbon dioxide laser for the power amplifier and is capable of generating infrared radiation at power outputs in excess of 100 kilowatts is described in a report by J. P. Carstens, et al. entitled, "Research Investigation of Laser Rock Kerfing," Report No. UARL-L911-329-8, Final Report on Contract No. DOT-FR-20021, November 1972.

As shown in FIG. 1, the small, collimated beam 8 from a moderate power, for example one or two kilowatt, oscillator-laser 1a is directed by mirrors 6 and 7 to a beam expander 1b. The beam is expanded to the desired diameter, in a known manner, by the beam expanding optics and passes to a power amplifier laser 1c which raises the power of the beam to that required for drilling. The high power beam is then projected through a conduit 3 to the low pressure side of an orifice window 4, hereinafter described in greater detail. The laser beam passes through the pressure window and enters the interior chamber 11 of wellhead 2 which is supplied, via conduit 14, with a high pressure transparent gas such as dry clean air, nitrogen or other gas having an equally low coefficient of absorbtion at the laser wavelength. A water-cooled reflector 10 disposed in chamber 11 deflects the beam downwardly into a tube 12 which passes through a gas-tight seal 13 at the bottom of the wellhead and extends along the well bore 5 to a point near the strata 15 at the well bottom. The high pressure gas introduced into chamber 11 enters at the top of tube 12 and flows through it to the bottom of the well maintaining the path of the beam free from energy absorbing impurities such as moisture, dust and the like. The laser beam is thus transmitted to the strata 15 at the well bottom through the gas flowing down the tube 12 with very little power loss since the purity and composition of the gas can be controlled to minimize absorption and scattering by contaminants.

The beam emerging from tube 12 impinges on the underlying strata 15 creating intense heat within the illuminated spot which vaporizes the rock at the surface and melts the solid rock beneath. The coaxial gas flow sweeps the evolving vapors from the path of the beam increasing the interaction between the rock and the beam. As the depth of the molten rock increases, less of the thermal energy input from the beam is conducted through the molten puddle to the underlying rock and more of the energy goes to vaporizing the surface until an equilibrium is reached between the vaporizing and the melting processes. Thus, the layer of molten rock acts as an insulator which limits the depth of the puddle to the order of a fraction of an inch with most of the energy of the beam being used to vaporize the molten rock at the surface.

The vaporizing rock radiates a large amount of thermal energy in the form of visible light and infrared radiation, nearly all of which is absorbed by the wall of the hole within a height of several hole diameters from the bottom. The amount of radiated energy is dependent on the vaporization temperature, which for typical rock is approximately 3000° C., and the surface area irradiated by the beam. In the case of a beam-spot about an inch in diameter, radiation from the vaporizing surface is sufficient to melt the rock of the walls which then flows into the puddle and is vaporized by the laser beam. The amount of wall melting is proportional to the energy radiated from the vaporizing rock and, also, to the exposure time to the radiation, which in turn is dependent on the penetration rate.

The size of the hole can thus be controlled by controlling the rate of penetration through an appropriate adjustment of the laser power output. For example, for a constant spot size, an increase in beam power increases the penetration rate and reduces the exposure time of a given point on the wall to thermal radiation from the irradiated rock at the receding hole bottom. Hence, at very high beam powers and penetration rates there is relatively little wall melting and the finished hole diameter is nearly equal to the spot diameter. On the other hand, if the laser beam power is reduced with no change in the spot size, the amount of radiation from the vaporizing surface of the puddle, and therefore the rate of wall melting, remains unchanged provided that the beam power does not decrease below the level required to maintain the rock at the vaporization temperature. However, because the penetration rate decreases, the walls are subjected to thermal radiation from the vaporizing rock for longer periods and the amount of wall melting increases accordingly. As the depth of molten puddle at the bottom increases due to wall melting, less of the beam energy is conducted to the bottom further reducing the penetration rate. At power levels at which the penetration nearly ceases, the hole enlarges rapidly due to the increased wall melting as a result of long exposure of the walls to the thermal radiation from the essentially stationary vaporizing surface until an equilibrium is reached between the beam power input and the heat loss due to conduction into the surrounding rock.

Alternatively, the hole diameter can be controlled by varying the size of the beam spot since at a given beam power, an increase or decrease of the spot size will produce a corresponding change in the amount of wall melting. If, for example, the spot size is increased without change in the beam power, the area producing thermal radiation, and hence the amount of wall melting will increase, provided that the power density does not decrease below that required to vaporize the rock.

As shown in FIG. 2, when drilling through a low permeability pay zone, the recovery of oil or gas can be increased by enlarging the hole drilled by the beam to increase the exposed surface area and hence the flow rate of the mineral. This is accomplished by adjusting the laser power or beam spot size to slow or stop penetration and allow wall melting to increase the diameter of the hole so that a cavity 27 is formed in the pay zone.

The vapors and debris produced by the beam as it drills through the rock are entrained in the gas discharging from the lower end of the tube 12 and carried to the surface by the upward gas flow in the annular area 25 between the tube and the wall of the bore. The debris-laden gas is then discharged from the hole through conduit 16 and vented to the atmosphere or recycled after being purified by any conventional filtration apparatus. The wall melt produced by the beam during drilling forms a vitreous layer which serves as a liner for the bore hole preventing seepage of unwanted material such as water from the surrounding strata. At the desired depth, or depths of the pay zone a brief jet of water sprayed into the hole shatters the hot glaze on the interior of the hole, permitting the oil or gas to flow into the well. The vitreous lining formed by the laser beam thus obviatees the need for cement, casings and casing perforators used in conventional drilling.

As the depth of the hole increases, additional sections of tubing may be introduced through an air lock 17 mounted on the wellhead 2. The new tube section is added by positioning it in the air lock 17 which is then pressurized. Once the pressures in the air lock and the interior chamber 11 are equalized, the laser is turned off, reflector 10, which is mounted on a retractable shaft 18 is retracted and the gate valve 19 at the bottom of the air lock opened. The new section is then lowered into the interior chamber 11, secured to the uppermost section of the tube string and the entire string lowered into the bore hole until the top of the new section is in the proper position for the drilling operation to resume.

The information required to monitor and control the drilling process may be provided by optical instruments located at the surface installation. The depth of the hole and the distance from the lower end of the tube 12 to the hole bottom can be measured, for example, by a pulsed laser operating in a manner similar to that of radar. The pulsed laser 20 is disposed near the oscillator laser 1a and the pulsed beam 21 is introduced into the same optical path as that traversed by the drilling beam through a selective mirror 7 which reflects only the drilling laser wavelength and is transparent to the pulsed laser wavelength. The pulsed beam from the ranging laser propagates down the bore hole through the same optics and the gas filled tube as the drilling beam and a small amount of the pulsed beam energy is reflected from the rock at the hole bottom back up along the same path. As in radar, the travel time of the pulse is a measure of the distance and provides an accurate measurement of the hole depth. Another selective mirror, designed to reflect only the pulsed laser radiation, can be added to provide access at any other wavelengths. In this way, a single optical path to the bottom can be shared by any number of active or passive optical devices. For example, a spectrograph can be added to collect some of the broad spectrum of radiation emitted by the incandescent rock at the bottom of the hole. The temperature and elemental composition of the rock can then be deduced from the emitted spectrum. Also, a tunable pulsed laser may be added for down-hole absorption spectroscopy of the evolving rock vapor and gas to determine their compositions. When required, the drilling laser could be shut down briefly to allow more volatile molecules, such as hydrocarbons, to accumulate for analysis. The same instrument, or a more conventional gas analyzer, could of course be applied to the gas returning from the hole.

In addition to maintaining the path of the laser beam propagating through tube 12 free from contaminants and removing drilling debris, the gas injected into the bore hole also serves as a means for preventing caving of the well bore by containing the formation pressure. Since the overburden pressure typically increases by several tenths of a pound per foot of hole depth, a gas pressure in excess of 100 atmospheres is required to offset the formation pressure encountered at the bottom of a hole, which typically may be several thousand feet deep. The laser drilling system, therefore, requires a pressure window capable of containing gas at such high pressure and at the same time able to pass a high energy beam from the laser into the high pressure environment of the bore hole.

Orifice Pressure Window

Figure 3:
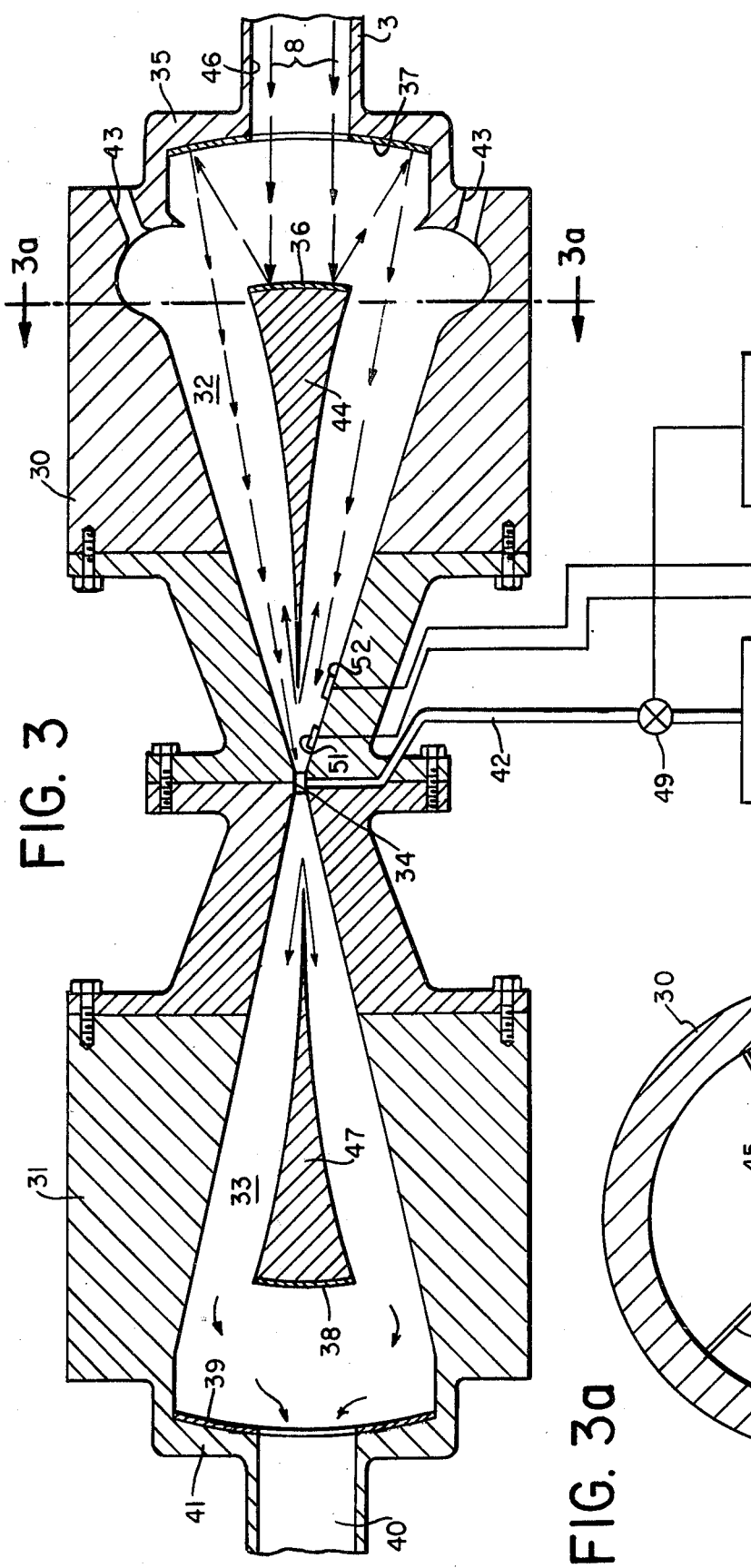
FIG. 3 is a sectional view of an orifice pressure window in accordance with the invention.

The orifice window 4 of FIG. 1 for passing the laser beam into the high gas pressure region of the bore hole is shown in greater detail in FIG. 3. In accordance with the invention, the window comprises two housings 30 and 31 each having an interior chamber of a generally conical cross section which are connected at their vertices by a very small diameter duct or orifice 34. Chamber 33 of housing 31 is in fluid communication via conduit 40 connected to its rear wall or base 41 with the high pressure gas in the chamber 11 of the wellhead structure shown in FIG. 1. Conduit 3, from laser 1c of FIG. 1, is connected to base 35 of chamber 32 containing gas at a lower, for example, atmospheric pressure. To facilitate the design of the optics employed in the window the laser is preferably of the type which generates an annular beam permitting the use of double-reflector focusing and collimating systems. The beam of the desired shape may be produced, for example, by masking the central portion of the solid beam from the low power oscillator laser before it enters the power laser amplifier.

Housing 30 includes a pair of reflectors 36 and 37 which form a double-reflector optical system for focusing the beam entering chamber 32 to a spot at the center of the orifice 34. Reflector 36 of the focusing optics is mounted on the end of a conical member 44 opposite the beam entrance port 46 and is arranged to direct the emergent beam against an annular reflector 37 which is mounted on the rear wall 35 of chamber 32 and extends about port 46. As shown in FIG. 3a, the conical member 44 is supported from housing 30 by webs 45 which have a small cross section to minimize interference with the beam. Radiation scattering from webs 45 can be further reduced by provision of corresponding void spaces in the annular beam by, for example, using an appropriately shaped mask to obtain the desired geometrical pattern in the beam from the oscillator laser prior to amplification. A pair of reflectors 38 and 39 disposed in the high pressure chamber 33 of housing 31 are arranged to collimate the divergent beam emerging from orifice 34 and direct it into conduit 40 leading to the wellhead. The annular reflector 39 is mounted on the base or rear wall 41 of chamber 33 in a position to direct the beam from orifice 34 against reflector 38 on the end of a conical member 47 which is supported from the housing 31 in the same manner as member 44 in housing 30.

The collimated high energy beam 8 enters the low pressure chamber 32 through conduit 3, is focused to a spot at the center of the orifice 34 by reflectors 36 and 37 and passes into the high pressure chamber 33. The divergent beam emerging from orifice 34 is then recollimated by the collimating reflectors 38 and 39, disposed in the high pressure chamber 33, and passes through conduit 40 to the pressurized chamber 11 at the wellhead. The focal ratio of the focusing optics is kept small enabling the laser beam to be focused to a very small spot so that only a negligible amount of gas leaks from the high pressure chamber 33 through the correspondingly sized orifice. The gas discharging from the orifice 34 is deflected by the conical rear surface of member 44 into outlet ports 43 disposed about the periphery of base 35 and vented to the atmosphere so that only a very small part of the gas flowing into the low pressure chamber 32 enters conduit 3 leading to the laser.

The electric field in the focused beam reaches its maximum value at the geometric focus of the optical system and diminishes with distance from the focal point. The decrease of the field generally follows a sinc function in the axial direction and a besinc function in the radial direction from the focus so that the region of maximum power density is centered about the focal point and approximates an ellipsoid elongated along the optical axis. In the case of multi-kilowatt beams such as required for drilling, the electric fields in this region may reach levels well above the breakdown gradient of a gas such as air or nitrogen at atmospheric pressure. However, since the breakdown gradient of the gas at a given temperature is approximately proportional to its density and hence pressure, breakdown can be prevented even at very high beam powers by maintaining adequate pressure in the regions of high power densities. To this end the diameter and length of the elongated orifice or duct 34 is chosen so that it encompasses the ellipsoidal region of maximum power density. The pressure of the gas in this and the adjacent regions of high power density is maintained at a level adequate to prevent breakdown by introducing a high pressure gas into the orifice through conduit 42 connected to its center. The high pressure gas is supplied from a source 48, which may be a pump or a tank of a compressed gas, connected to conduits 42 through a pressure regulating valve 49 by means of which the pressure can be adjusted to the desired value.

The diameter of the orifice may be made for example, approximately equal to the diameter of the fifth dark ring of Airy's pattern, which contains 96.3 percent of the beam energy, given by the following equation:

$$d_5 = 10.488 f/d \quad (1)$$

Similarly, the length of the orifice may be made approximately equal to the distance between the first axial nulls of the diffraction pattern, each of which is displaced from the focal plane by a distance:

$$s = 8\lambda(f/d)^2 \quad (1a)$$

Using focusing optics with a focal ratio $(f/d)$ of 4 and assuming a laser wavelength $(\lambda)$ of 10 microns, i.e. $10^{-5}$ meters, which is approximately the wavelength of radiation produced by a carbon dioxide laser, the diameter of the fifth dark ring, as given by equation (1) is $4.195 \times 10^{-4}$ meters or 0.0165 inches. The displacement of the first axial nulls from the focal plane, as given by equation (1a) for the assumed wavelength and focal ratio is $1.28 \times 10^{-3}$ meters or 0.05 inches and hence the distance between the first nulls is 0.10 inches. Equations 1 and 1a are, however, based on ideal optics and in a practical system due to distortion of the beam and focusing optics a somewhat smaller percentage of the beam energy than the theoretical value of 96.3 percent would be concentrated in a 0.0165 inch diameter spot. The equations nevertheless demonstrate that by using focusing optics with a focal ratio of about 4, an orifice with a diameter in the order of a few hundredths of an inch would be capable of passing approximately 96 percent of the beam energy from the low to the high pressure sides of the window. Thus, the amount of gas leaking through an orifice of such small diameter would be negligible even at pressure differentials of several hundred atmospheres.

Some of the energy of the beam in the case of orifices of such small diameter, would be intercepted by the surrounding wall. However, since the wall around the orifice is conical, the incident beam impinges on the wall surface at an acute, rather than at a perpendicular angle, so that the received power density is reduced by the sine of the conical half-angle. The amount of absorbed energy can be further reduced by plating the walls with a highly reflective coating, by polishing, or the like. Additionally, the walls and the reflectors used to focus and collimate the beam may be cooled by circulation of water or other coolant beneath the surfaces exposed to high power densities.

When the pressure differential between the center and the downstream end of the orifice exceeds the "critical pressure ratio," which is about 2 for a gas such as air or nitrogen, the energy available from adiabatic expansion is sufficient to accelerate the gas emerging from the orifice to the speed of sound. Hence, under such conditions, the pressure drop through the orifice cannot exceed about 2 to 1 and the mass flow rate becomes independent of downstream pressure. However, as the gas flows from the orifice into the adjacent conical section of the window chamber, it expands, and in the case of non-turbulent flow, its pressure and density would decrease inversely with the cross section area or inversely with the square of distance from the focus. The electric field in the focused beam, on the other hand, decreases inversely with the first power of distance from the focus. Although, in actual practice the flow in the conical expansion region would be somewhat turbulent and therefore its pressure and density would decrease less rapidly than for non-turbulent flow, particularly in the region beyond the immediate vicinity of the orifice, the rate of decrease may nevertheless exceed that of the electric field. Thus, in order to maintain the pressure of the gas in the conical expansion region above the breakdown threshold, the initial pressure of the gas introduced through conduit 42 must be greater than that dictated by the electric gradient in the orifice.

Figure 4:
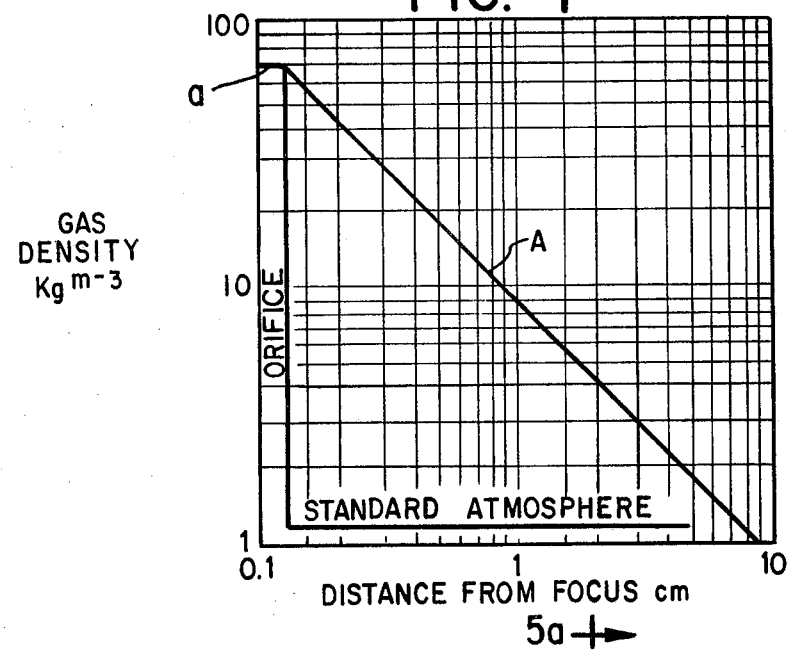
FIG. 4 shows a curve illustrating the required gas density profile in a typical orifice window.

Curve A of FIG. 4, illustrates the gas density required to prevent breakdown for the case of focusing optics with a focal ratio of 4 and a hundred kilowatt laser beam. The horizontal portion "$a$" of the curve represents the gas density required to prevent breakdown in the region of maximum electric field gradient within the orifice. As shown in FIG. 4 for the assumed beam power and focal ratio of the optics, the required density in this region is approximately 68 kg. per cubic meter which corresponds to a pressure of about 60 standard atmospheres. Since the electric field decreases with the first power of distance from the focus, the minimum required density decreases at a corresponding rate from the 68 kg. per cubic meter at the focus to a density equivalent to one standard atmosphere at about 8 centimeters from the orifice. The pressure of the gas introduced into the orifice must, therefore, be such that the density of the gas in the orifice and in the downstream conical expansion region is above the minimum required density profile represented by curve A.

In practice, the actual values of the minimum gas density required to prevent breakdown may of course vary from those shown in FIG. 4 depending on such factors as laser power, wavelength and focal ratio of the optics used. For example, the power density in the region of the focus for a given beam power may be reduced by using focusing optics with a larger focal ratio to increase the spot size. The volume of gas leaking through the correspondingly larger orifice is increased but the required gas density and pressure is decreased.

As shown in FIG. 3, the pressure regulating valve 49 in line 42 may advantageously be controlled by a controller 50, of any known design, which is connected with and responsive to a pressure sensor 51 disposed in the low pressure chamber near the orifice 34. In such an arrangement, the system is initially adjusted so that the gas introduced into the orifice is at a pressure adequate to prevent breakdown and if thereafter the pressure drops below the required value, the change is sensed by sensor 51 and signaled to controller 50 which then automatically adjusts valve 49 to accordingly increase the pressure of the gas supplied to orifice 34.

The controller 50 may also be connected with and made responsive to a radiation sensor 52 disposed in chamber 32 near the orifice for monitoring the power level of the laser beam. In this arrangement, the system is responsive to variations in the power level of the beam, as well as variations in pressure, and if the power of the beam increases, the pressure of the gas injected into the orifice is automatically increased to compensate for the higher power densities. The radiation sensor 52 may also be used to detect and signal any misalignment or distortion of the beam that could give rise to excessive heating of the wall surrounding the orifice.

Because of the high pressures required to offset the formation pressure, in typical laser drilling operations the pressure differential across the window would exceed the "critical pressure ratio," and as discussed earlier, under such conditions the pressure drop across the orifice cannot be greater than about 2 to 1 for a gas such as air or nitrogen. A gas pressure in chamber 33 about twice the minimum required in the orifice would therefore be adequate to prevent breakdown provided the pressure of the expanding gas flow from the orifice did not decrease faster than the inverse first power of distance from the focus. Thus at high operating pressures, gas breakdown can be avoided by limiting the expansion of the gas flow in the conical section of the low pressure chamber as well as by the introduction of a high pressure gas into the orifice from an external source.

Figure 5:
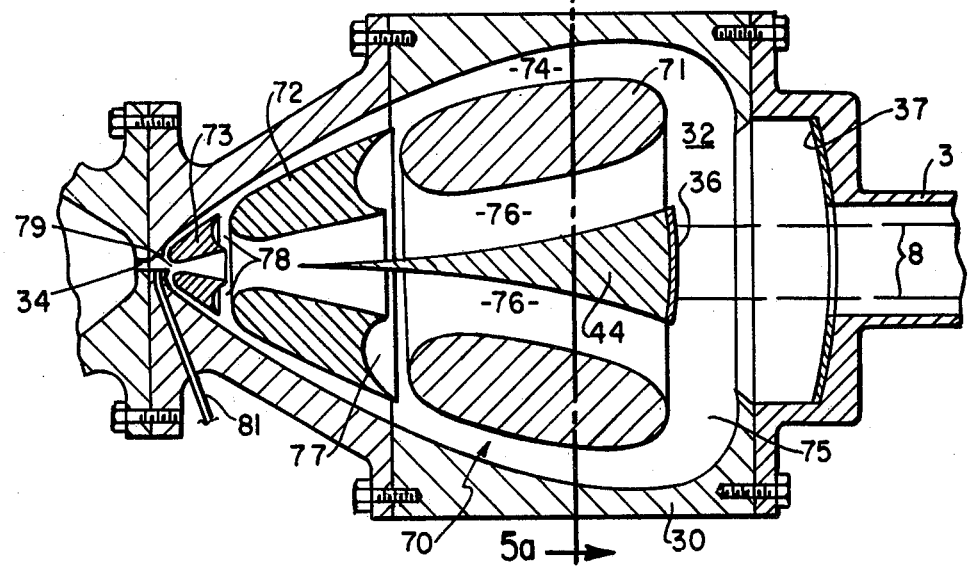
FIG. 5 is a partial sectional view of an alternative embodiment of the orifice window in accordance with the invention.
Figure 5A:
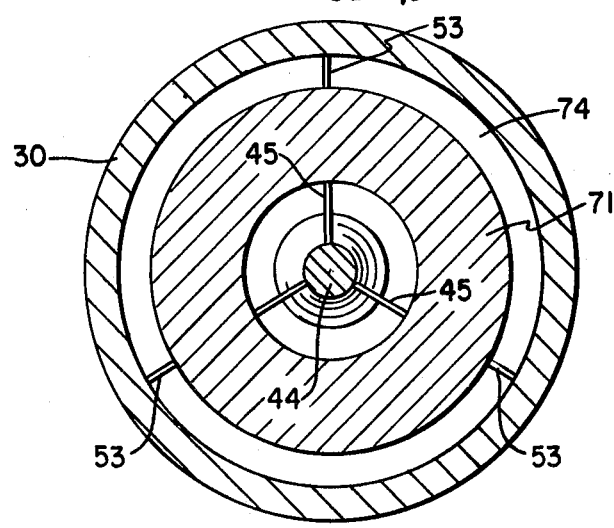
FIG. 5a is a sectional view taken along line A—A of FIG. 5.

FIG. 5 shows one such arrangement wherein a recirculation of the gas flow from the orifice is used to limit the expansion of the gas in the downstream region to a rate at which its density is adequate to prevent breakdown. The orifice pressure window of this embodiment includes a diffuser, generally indicated at 70, disposed in the low pressure chamber 32. Diffuser 70 is formed by annular member 71, 72 and 73 which surround the conical space defined by the periphery of the convergent beam focused by reflectors 36 and 37. The conical walls of chamber 32 and the adjacent surfaces of annular members 71 to 73 define a flow channel 74 the cross sectional area of which decreases gradually with distance from the annular inlet port 75 to convert the momentum of the gas flow back to pressure. Flow channel 74 communicates with the expansion region 76 via annular spaces or outlets 77, 78 and 79 spaced along its diminishing cross section at points which provide flows at the appropriate pressure. As shown in FIG. 5a, the annular members 71, 72 and 73 are supported from the housing 30 by webs 53 and in turn support the conical member 44.

The bulk of the high velocity gas flow from the orifice 34 is diverted by the conical surface of member 44 into the inlet port 75 and as it flows through the diminishing cross section area of channel 74 its momentum is gradually converted back to pressure. The gas discharging from the orifice thus returns, via channel 74, back to the upstream end of the conical expansion region 76 and is reintroduced through the annular outlets 77 to 79. The gas from outlet 79 at the end of channel 74 flows coaxially about the flow from the orifice 34 and limits its cross section expansion thereby reducing the rate at which the pressure and density of the gas decrease along the beam axis. In the same manner, the gas from outlet 78 flows about and limits the expansion of the flow from outlet 79 and is in turn confined by the flow from outlet 77.

The size and position of each outlet is chosen to provide the pressures and flow rates needed to reduce the expansion rate to a level at which the pressure of the gas along the beam axis is adequate to prevent breakdown and the number of the outlets can be increased if greater control of the gas density distribution is desired. If required, the pressure of the gas flows from the outlet ports can be increased by a pump or by additional flows from a source other than the diffuser to compensate for frictional losses in the flow channel. To prevent pressure build up in the low pressure chamber, part of the gas flow from the orifice is vented either through a discharge port in the flow channel of the diffuser disposed at a point corresponding to the desired discharge pressure or through a port in conduit 3.

The gas pressure in the vicinity of the orifice may be augmented by introducing a gas through conduit 81 extending through housing 30 to a point near the discharge side of orifice 34. The gas to conduit 81 may be supplied by a pump from a low pressure exit tap in the diffuser or from an external source. Moreover, the technique for maintaining the gas density at the desired level of FIG. 5 may be used with the window of FIG. 3. In such an arrangement a diffuser disposed in both the high and low pressure chambers can be used to limit the expansion of gas flow from the orifice so that the gas can be introduced into the center of the orifice at a lower pressure.

Figure 6:
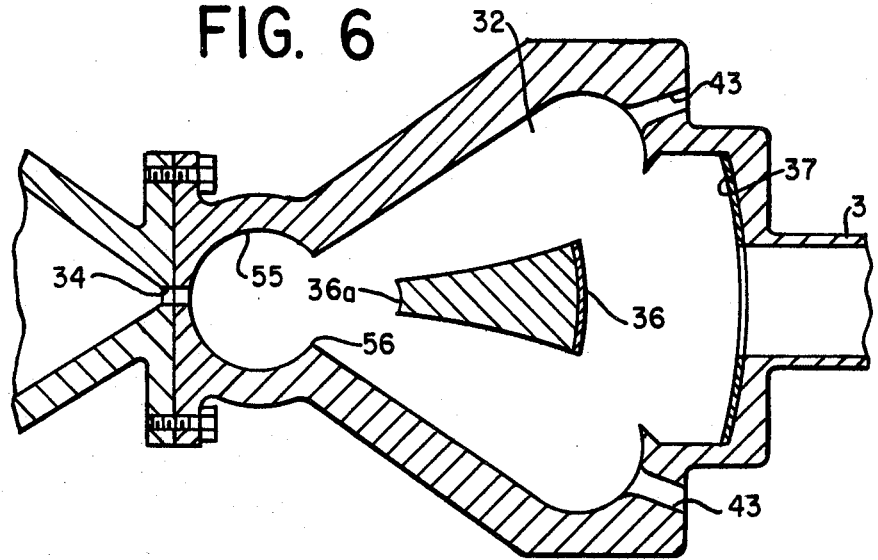
FIGS. 6 and 7 are sectional views of alternative embodiments of the orifice window in accordance with the invention.

FIG. 6 shows another embodiment of the window wherein a vortex generator is used to induce turbulence in the gas flow from the orifice to reduce the velocity and hence increase the pressure of the gas in the conical expansion region. The vortex generator 55 is in the form of a spherical bulge in the conical wall of chamber 32 near the orifice 34 and has an annular wall 56 which extends into the gas stream to generate turbulence in the flow. The axial momentum of the gas discharging through the orifice is thus converted by the vortex generator to increased pressure in the region of the high power densities. As shown in FIG. 6, the pressure may be further increased by forming the rear surface 36a of reflector 36 such that it deflects part of the incident gas stream back toward the orifice. The technique for increasing the gas pressure of FIG. 6 may be used in combination with either of the arrangements shown in FIGS. 3 or 5, or in the case of operating pressures of about three or four hundred atmospheres, the induced turbulence may in itself be adequate to maintain the gas at the required pressure to prevent breakdown.

Figure 7:
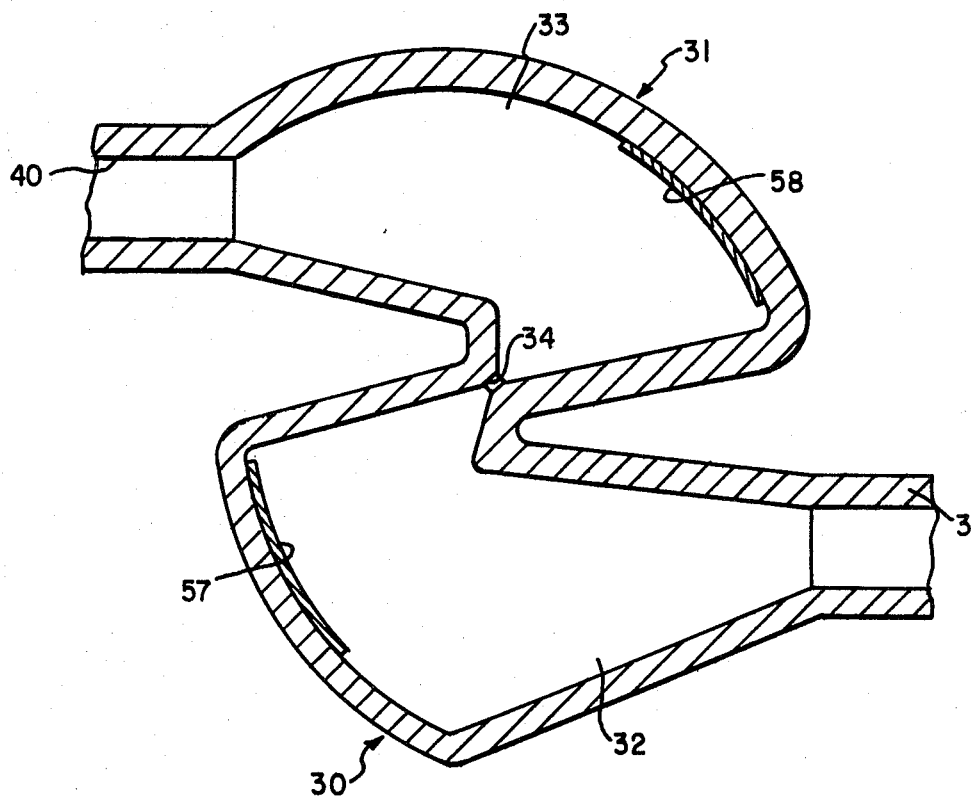

The orifice window, illustrated in FIG. 7, operates in the same manner as the windows hereinabove described, except that a single parabolic reflector 57 is employed to bring the laser beam to a focus at the orifice 34 instead of a double reflector optical system. Similarly, the divergent beam emerging from the orifice 34 is recollimated by a parabolic reflector 58 disposed in the high pressure chamber 33. Since unitary parabolic reflectors are employed to focus and recollimate the laser beam, the orifice window of FIG. 7 can be used to transmit a solid, as well as an annular beam. Moreover, any of the techniques for increasing the pressure of the gas in the region adjacent the discharge side of the orifice illustrated in FIGS. 3, 5 and 6 may be employed to avoid gas breakdown in the window shown in FIG. 7.

The orifice window of the invention thus permits a high energy beam to be transmitted with minimal power loss into a very high pressure region from a region of atmospheric or subatmospheric pressure wit only a minimal leakage of gas from the high to the low pressure regions. Although the window of the invention has been described with respect to a laser drilling system, it can be used in any applications which require a laser beam to be transmitted between two regions containing gas at different pressures, especially in applications wherein solid gas-impervious windows cannot be used because of high beam power levels, the high or low temperatures of the gases or because a solid window would be too lossy at the particular laser wavelength.

Drilling Power Requirements

When drilling through rock strata by a beam from a high power laser some of the thermal energy input from the beam is required to raise the temperature of the rock to its melting or fusion temperature and to convert it from solid to liquid. Additional thermal energy is then required to raise the temperature of the molten rock to the vaporization temperature and to convert it from liquid to gas. In the process, some of the energy input is lost by conduction into the surrounding rock strata.

The power requirement for drilling by vaporization is determined by the hole size, the thermodynamic parameters of the rock, the penetration rate, and the heat conduction loss from the hole bottom.

The power ($P_M$) required to heat the rock to the fusion temperature and convert it to liquid may be calculated from the following equation:

$$P_M = [\rho(\pi r_2^2)\frac{ds}{dt}] [k_h(T_F - T_A) + k_f] \quad (2)$$

where:

$\rho$ = rock density
$r_2$ = hole radius (Cm)
$ds/dt$ = penetration rate (Cm/Sec.)
$k_h$ = heat capacity
$k_f$ = heat of fusion
$T_F$ = fusion temperature
$T_A$ = ambient rock temperature.

Similarly, the additional power ($P_V$) required to raise temperature of the molten rock to the vaporization temperature and convert it from liquid to gas is given by:

$$P_v = [\rho(\pi r_2^2)\frac{ds}{dt}] [k_h(T_V - T_F) + k_v] \quad (3)$$

where $k_v$ = heat of vaporization
$T_V$ = vaporization temperature.

The rate at which thermal energy is conducted away from the hole is proportional to the surface area, thermal gradient and thermal conductivity of the rock. Using a spherical model to approximate heat conduction loss, the rate of thermal energy transfer may be calculated from the following equation:

$$P = -k_c A (dT/dr) \quad (4)$$

where:

$P$ = rate of energy transfer
$k_c$ = thermal conductivity
$A$ = surface area = $4\pi r^2$ (sphere)
$-dT/dr$ = temperature gradient.

Integration and substitution of integration constant yields:

$$P = \frac{4\pi k_c}{\frac{1}{r_2} - \frac{1}{r_a}} (T_F - T_A) \quad (5)$$

where:

$r_2$ = hole radius at temperature $T_F$
$r_a$ = radius to rock at temperature $T_A$.

Since the heat is conducted to a large radius in the surrounding rock, $r_a$ is much larger than $r_2$ and equation 4 simplifies to the following expression for power loss ($P_L$) due to heat conduction:

$$P_L = 4\pi k_c r_2 (T_F - T_A), \quad r >> r_2. \quad (6)$$

As heretofore discussed, the surface of the vaporizing puddle of molten rock is at a very high temperature and therefore emits considerable infrared and visible radiation. The power radiated ($P_r$) from the vaporizing surface may be calculated from the following equation:

$$P_4 = \sigma\epsilon (T_v + 273) 4\pi r_1^2 \quad (7)$$

where:

$\sigma$ = Stephan-Boltzman Constant = $5.67 \times 10^{-12}$ watt cm$^{-2}$ deg
$\epsilon$ = emissivity (approximately 0.9)
$r_1$ = beam-spot radius Because of the fourth power of absolute temperature dependence, the radiation from surfaces at melting temperature or lower is negligible.

The thermodynamic parameters of typical rock are given in the following table:

Table I

| Assumed Rock parameters | |
|---|---|
| Density ($\rho$) | 2.7 gm cm$^{-3}$ |
| Thermal conductivity ($k_c$) | .02 joule sec$^{-1}$ deg$^{-1}$ |
| Heat Capacity ($k_h$) | .85 joule gm$^{-1}$ deg$^{-1}$ |
| Ambient Rock Temperature ($T_A$) | 50 deg C. |
| Fusion Temperature ($T_F$) | 1,500 deg. C. |
| Heat of Fusion ($k_f$) | 200 joule gm$^{-1}$ |
| Vaporization Temperature ($T_V$) | 3,000 deg C. |
| Heat of Vaporization ($k_v$) | 400 joule gm$^{-1}$ |

The computed power requirements for penetrating through rock having the thermodynamic parameters given in Table 1 by a laser beam focused to a spot 3 inches in diameter ($r_1$ = 3.85cm) and the effects of laser beam power variation based on the above equations are summarized in Table II below:

Table II

| Sample Calculations | | | | | |
|---|---|---|---|---|---|
| Power Input | $P_{in}$ | 94,262 | Watts | 49,588 | watts |
| Penetration Rate | ds/dt. | .08650 | cm sec$^{-1}$ | .00163 | cm sec$^{-1}$ |
| Spot Radius | $r_1$ | 3.85 | cm | 3.85 | cm |
| Hole Radius | $r_3$ | 6.35 | " | 30.0 | " |
| Puddle Radius | $r_2$ | 4.0173 | " | 7.5601 | " |
| Power Radiated | $P_r$ | 27,274 | watts | 27,274 | watts |
| Power Vaporizing | $P_v$ | 49,560 | " | 20,836 | " |
| Power Melting | $P_m$ | 42,388 | " | 17,820 | " |
| Walls | $P_{mw}$ | 25,423 | " | 16,688 | " |
| Bottom | $P_{mb}$ | 16,965 | " | 1,132 | " |
| Power Loss | $P_L$ | 2,314 | " | 10,932 | " |
| Walls | $P_{Lw}$ | 1,851 | " | 10,585 | " |
| Bottom | $P_{Lb}$ | 463 | " | 347 | " |

It will be seen from the first column of Table II that a 100 kilowatt laser beam with a three inch ($r_1$ = 3.85 cm) diameter spot will drill a 5 inch ($r_3$ = 6.35 cm) diameter hole at a penetration rate of approximately 10 feet per hour ($ds/dt$ = 0.08650 cm/sec). The power loss due to heat conduction, from a 5 inch diameter hole into the surrounding rock moreover, is only a few percent of the total power required to drill through the rock at that penetration rate. Thus, at high power levels, the conduction loss is negligible and the penetration rate is nearly proportional to the laser beam power. However, as can be seen from the second column, when the input power is reduced by approximately 50 percent, the hole diameter produced by the same size beam spot enlarges to 24 inches ($r_3$ = 30cm) with a comcomitant large reduction of the penetration rate.

The power requirements and losses presented in Table II are approximations since the mathematical models used have been idealized to simplify calculations. Moreover, the computed values are based on the assumed rock parameters of Table I, and the actual power requirements and penetration rates will vary with the type of rock encountered during drilling. For example, both the hole diameter at which wall melting becomes significant and the magnitude of hole enlargement at reduced power are functions of the vaporization temperature of the rock. As shown by equation 7, the radiation from the puddle is proportional to the fourth power of temperature, and therefore, a small variation in the vaporization temperature of the rock will cause a very large variation in the amount of wall melting and consequent hole enlargement.

Although the values presented in Table II are approximations, they nevertheless indicate that a laser with a power output in the range of 100 kilowatts is capable of drilling holes of sizes and at penetration rates comparable to those achieved by conventional rotary drill rigs, as well as the feasibility of forming large diameter cavities for increased recovery of minerals in a low permeability pay zone by controlling the beam power.

Beam Divergence Effects

There are several constraints which limit the depth of the hole that can be drilled by a laser beam without the aid of a beam guide. One such factor is divergence of the beam due to diffraction and the concomitant reduction of the power density in the enlarged spot at the beam focus or terminus. Even a perfectly collimated beam of monochomatic radiation propagating through a vacuum will undergo divergence due to diffraction at a rate proportional to the axial distance from the beam exit aperture and wavelength and inversely proportional to the size of the aperture from which the beam is projected. Moreover, a beam from a high power laser will suffer additional degradation as a result of thermally induced distortion of the laser optics and the laser medium itself. Even the most careful design of a multikilowatt laser will typically produce beam divergence two or three times greater than that due to diffraction alone.

Figure 8:
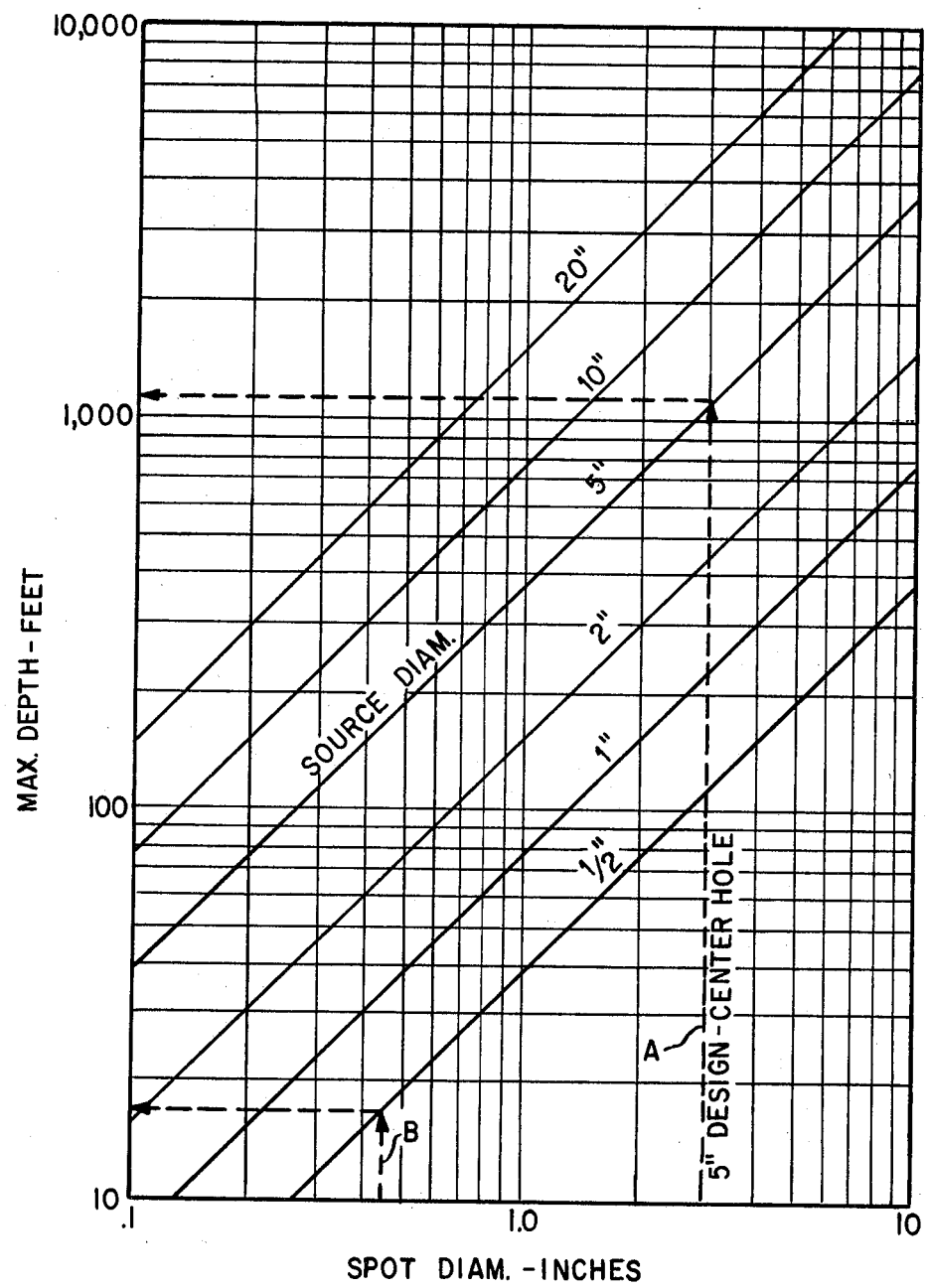
FIG. 8 shows a set of curves illustrating the constraints imposed on hole depth by diffraction beam spreading.

The set of curves presented in FIG. 8 show the maximum distance or depth at which a given spot size can be achieved for several source aperture sizes for a laser wavelength equal to 10 microns, as in the case of a carbon dioxide laser, in a system wherein the beam divergence due to distortion is assumed to be twice that due to diffraction. The dashed line A shows that a three inch spot, to drill a 5 inch hole, cannot be achieved at a depth greater than about 1000 feet when the source diameter, defined by the hole size, is limited to five inches. A similar entry for a half-inch hole size yields a maximum depth of seventeen feet as shown by dashed line B.

Furthermore, a high power laser beam propagating through a gas such as air, undergoes additional divergence due to "thermal blooming" resulting from nonuniform heating of the gas in its path. The air along the axis of such a beam is heated through absorption of beam energy to a higher temperature than that of the air at the beam periphery. As the heated air along the beam axis expands its density, and therefore its index of fraction decreases below that of the cooler gas at the beam periphery. As a result, the column of gas acts as a series of weak negative or concave lenses which diverge or spread the beam and limit the power density that can be delivered at the terminus. Because of the low thermal conductivity of air, the divergence or "blooming" increases until convection of other air movement moves the heated air out of the beam path. The amount of beam divergence due to "thermal blooming," is dependent on the beam diameter, power density and the exposure time of the air to heating by the beam.

In applications such as deep hole drilling which require a large diameter high energy beam, the thermal blooming phenomena dominates over diffraction and severely limits both the depth and power density available for drilling. The effect of thermal blooming can be reduced by reducing the absorption coefficient of the gas since this has substantially the same effect as a decrease in the time of exposure to heating. Thus, the depth of a well bore drilled by a laser beam can be increased by maintaining the gas tube near the bottom of the hole to reduce contamination of gas in the path of the beam. This measure, together with careful attention to filtration and composition of the gas may reduce the coefficient of absorption and thermal blooming enough to reach the diffraction limit, which for a carbon dioxide laser operating in a five-inch hole, is about 1000 feet.

The diffraction limit is, however, fundamental and for a given laser wavelength and source diameter a greater depth can only be achieved by using a beam guide to transmit the beam to the point of application.

Figure 9:
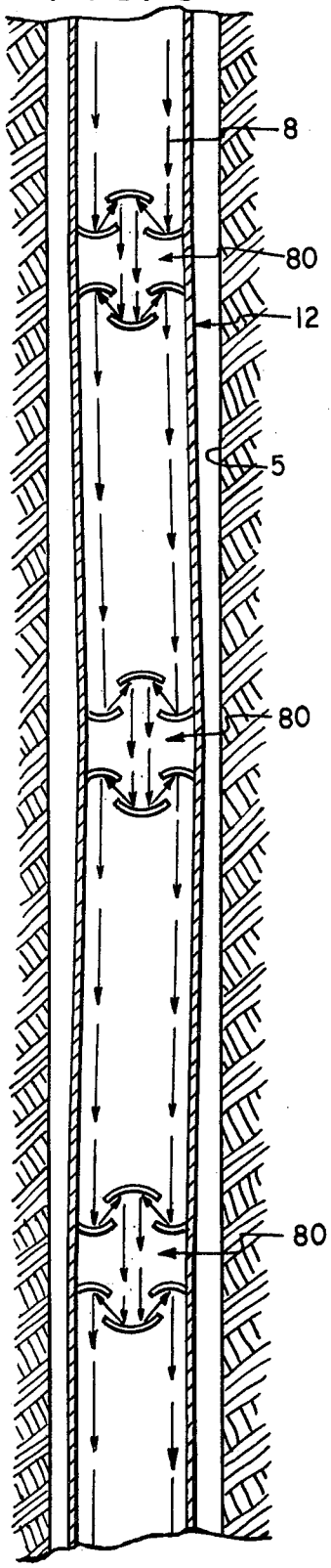
FIG. 9 is a sectional view of a beam guide using relay optics to converge the laser beam propagating to the bottom of the bore hole.

FIG. 9 shows one embodiment of a beam guide which may be employed to guide an annular laser beam 8 to the bottom of a deep hole. The gas tube 12 extending along the bore hole 5 is provided with a series of relay optics in the form of reflective focusing elements 80, periodically spaced along the length of tube 12. Because of the high power levels required for rock drilling, the focusing elements are preferably in the form of reflectors, as schematically illustrated in FIG. 9, which are able to withstand higher power densities than lenses, especially ones made from refractive materials commonly used at infrared wavelengths. The focusing elements 80 conserve brightness while confining and guiding the annular beam down the tube by repeatedly imaging and reimaging the radiation source so that the beam at the end is identical with the beam at the beginning, except for the effect of small losses and aberrations. Small offsets of the optics, as would be encountered in a slightly curving hole, cause the beam to be deflected in the same direction as the offset so that the beam is guided through the entire series of repeating optics.

The depth limitation due to diffraction and thermal blooming is essentially overcome by the relay optics of FIG. 9 and power loss becomes the depth-determining factor. Careful attention to contamination of the circulating air or gas will minimize both thermal blooming and losses, permitting large separation between the optics and a depth limit in excess of several thousand feet.

It is also possible to construct a beam guide in which the pressurized gas contained in the tube serves to guide the beam to the bottom of the bore hole in a manner similar to that of the relay optics shown in FIG. 9.

This is accomplished by introducing into the tube a high pressure gas which is at a lower temperature than that of the tube wall at a sufficiently low rate to maintain laminar flow. As the cold gas flows down the tube it is gradually heated through absorption of energy from the beam. However, at depths requiring the use of a beam guide, the gas is at pressures in the range of a hundred atmospheres in order to offset the overburden pressure. Since the heat capacity of a gas at a given temperature is directly proportional to pressure while thermal conductivity is essentially independent of pressure, the temperature rise of the entire gas column at such pressures due to heating by the beam is much slower than the temperature rise of the gas at the tube periphery due to thermal conduction from the tube wall. Thus, the layer of gas at the tube periphery is almost immediately heated by conduction from the wall to a higher temperature than that of the gas at the center establishing a radially increasing thermal distribution across the gas column. Because the layer of warmer gas adjacent the wall is less dense and therefore has a lower index of refraction than the cooler gas at the tube center, the transverse thermal gradient in turn produces a radially decreasing index of refraction distribution across the gas so that the beam is confined and guided along the tube axis.

The laminar flow avoids turbulence so that once established the desired temperature profile is maintained throughout the guided path. Furthermore, since the velocity distribution of laminar flow is parabolic, with zero at the wall and maximum at the tube center, the gas at the tube periphery is subjected to heating by the beam for longer periods and is therefore heated to a higher temperature than the gas at the center. Hence, laminar flow of the gas reduces the time required to establish the desired temperature profile and tends to maintain it during operation.

As the temperature of the gas starts to approach that of the tube wall due to heating by the beam and thermal conduction, it is purged from the tube by a brief high velocity charge of fresh cold gas. Because of the high heat capacity of gas at the operating pressures, it may take several hours for the gas column to reach thermal equilibrium with the wall and therefore, the intervals between successive purging operations are sufficiently long so that they do not unduly interfere with the drilling operation. For example, the gas may be purged from the tube at the same time that new sections of tubing are added to the tube string.

Because the low flow rate required to maintain laminar flow limits the capability of the gas to remove drilling debris, a second concentric outer tube can be provided for conveying additional gas down-hole at higher velocities to augment debris removal. The gas flowing through the outer tube can be heated so that it will in turn heat the wall of the inner beam guide tube, enhancing the establishment and maintenance of the requisite thermal gradient in the beam guide.

Figure 10:
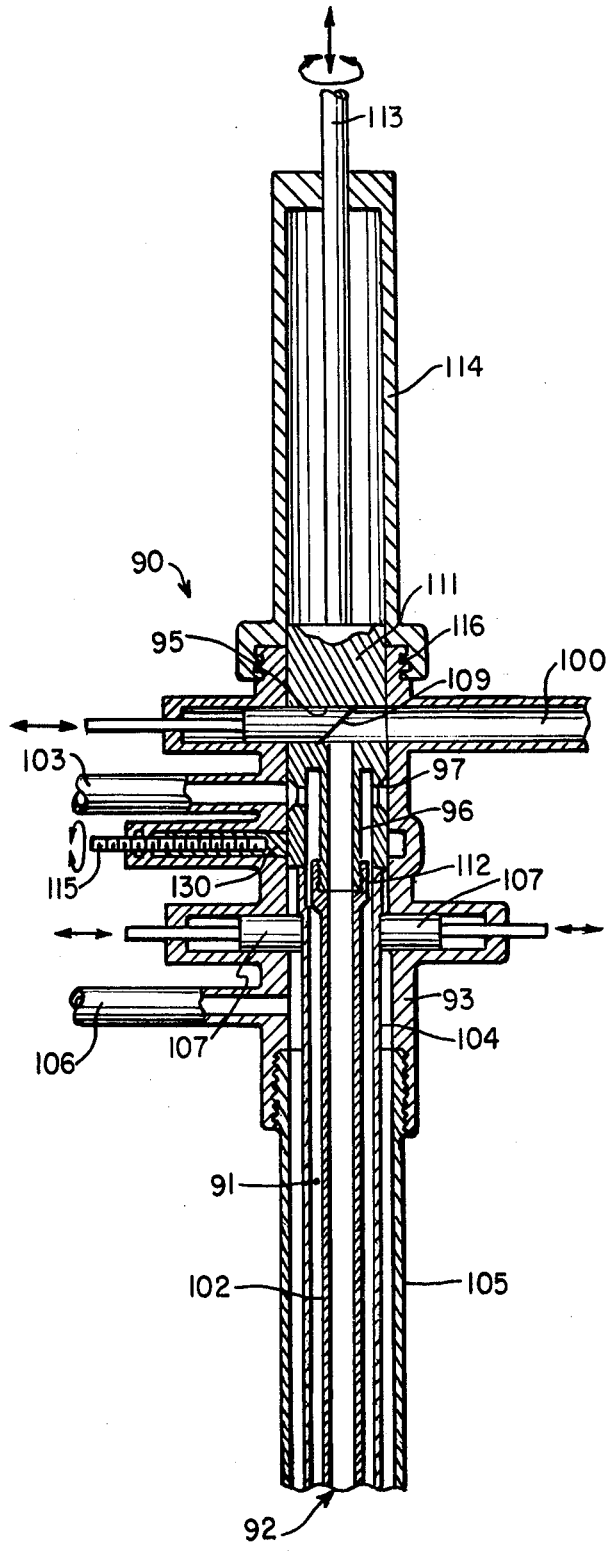
FIG. 10 is a sectional view of a thermal gas beam guide and wellhead mounting structure in accordance with the invention.

FIG. 10 illustrates the coaxial thermal gas beam guide and wellhead structure of the invention. The wellhead structure 90 comprises a housing 114 attached by means of interrupted threads 116 to tubular base 93 mounted on the well casing 105. The coaxial tube assembly 92 extends into the interior of base 93 and is held in position by a pair of hydraulically actuated rams 107 which engage the upper portion of the outer tube 104. The inner beam guide tube 102 is threaded onto a tubular extension 96 of spool member 111, which is slidably disposed in housing 114 and extends into base 93. Tube 102 communicates with inlet port 100 via extension 96 and a radial bore 95 extending through spool 111. Similarly, outer tube 104 communicates with port 103 via one of a plurality of radial bores 97 formed through spool 111.

The laser beam and a cold gas, such as dry clean air or nitrogen, enter the wellhead structure 90 through port 100 and impinge on a water cooled diagonal mirror 109 slidably disposed in bore 95. The beam and the gas stream are deflected by the mirror downwardly into the beam guide tube 102 and pass through it toward the bottom of the well. Hot air under pressure supplied by a compressor is introduced into structure 90 through port 103, enters the outer tube 104 via bore 97, and flows down the well in the annular space 91 between the two tubes 102 and 104. The return stream of debris-laden air and gas flows up the well casing 105 and is discharged through port 106. The return air may be filtered and returned at high pressure to the compressor to reduce its power requirements or used to drive a turbine for other power needs.

Figure 11:
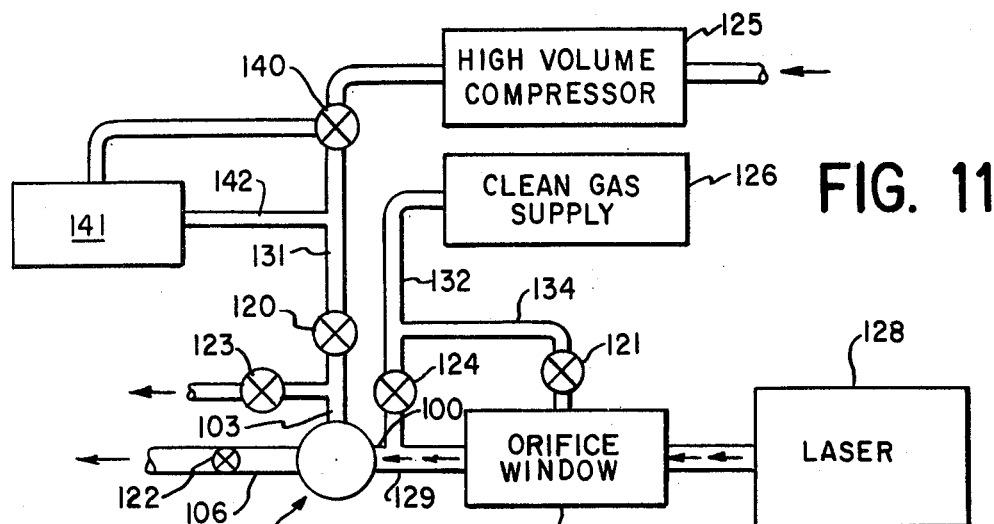
FIG. 11 diagramatically illustrates the surface installation of a laser drilling apparatus in accordance with the invention.

Referring now to FIG. 11, which diagrammatically illustrates the equipment of the surface installation, a high volume compressor 125, connected to port 103 by conduit 131 having a shut-off valve 120. supplies to the wellhead structure 90 hot air under pressure at a sufficiently high flow rate to remove the debris produced during drilling. When drilling deep holes, the compressor supplies air at a pressure of a hundred atmospheres or higher so that the air is heated by adiabatic compression to a temperature several hundred degrees above that of ambient air. In order to regulate the temperature of the air supply, a valve 140 is provided in conduit 131 for diverting a controllable amount of air through a cooling device 141, such as a heat exchanger. The cooled air returns, via branch line 142, to conduit 131 and mixes with the hotter air flowing thereat directly from the compressor. The temperature of the air supplied to outer tube 104 can thus be controlled by diverting a greater or lesser amount of air through the heat exchanger by an appropriate adjustment of valve 140.

Port 100 of the wellhead structure 90 is connected to conduit 129 leading to the high pressure side of an orifice window 127 of the type hereinabove described with reference to FIGS. 3 to 7. Clean pressurized gas is supplied to the high pressure side of window 127 from a tank 126 containing dry air or nitrogen via lines 132 and 134, the latter being provided with a metering valve 121 for controlling the pressure and flow rate of the gas. Line 132 from tank 126 is also connected through purging valve 124 directly to conduit 129 leading to port 100.

In operation, air cut-off valve 120, and return throttle valve 122, in the conduit connected to the gas discharge port 106, are open while the purging valve 124 is closed. Gas metering valve 121 is adjusted to provide the flow rate required to maintain laminar flow in the beam guide tube 102. The clean gas from tank 126 flows through conduits 132 and 134, cools upon adiabatic expansion through valve 121 and enters the high pressure side of orifice window 127. Part of the cold gas leaks through the orifice into the low pressure region of the laser 128, while the balance enters the wellhead structure 90 through port 100, and flows down the beam guide tube 102. At the start of the drilling operation, valve 140 is adjusted to divert most of the hot air from the compressor 125 through heat exchanger 141 so that the air supplied to the outer tube 104 is cooled to about the same temperature as the initial temperature of the coaxial tube assembly. The beam from laser device 128 passes through orifice window 127 into the high pressure gas, enters the wellhead structure 90 through port 100 and is directed downwardly into the tubular beam guide tube 102 by mirror 109.

The gas in tank 126 is maintained at a sufficiently high pressure so that it is cooled to a temperature well below that of the beam guide tube by adiabatic expansion when the pressure is reduced to that required to offset the overburden pressure. For example, when drilling at a depth of about five thousand feet, the gas in tank 126 may be stored at a pressure of 270 atmospheres and cooled from a temperature of about 100° to 50° F. when the pressure is reduced to the operating pressure of about 200 atmospheres upon expansion through metering valve 121. At the start of the drilling operation, the coaxial tube assembly, on the other hand, is at about the ambient rock temperature which, depending on depth, may be at 100° to 130° F. Thus, as the cold gas enters the beam guide tube, the peripheral layer is rapidly heated by the much warmer tube wall establishing the radially increasing temperature distribution required to guide the beam. The temperature distribution is, moreover, maintained across the gas even after it leaves the lower end of tube 102 at the well bottom by the coaxial flow of hot air discharging from the lower end of tube 104. The beam emerging from the beam guide tube is thus guided along the core of cold gas surrounded by the hot air to the underlying strata.

As the temperature of the gas in tube 102 rises during operation due to thermal conduction from the tube wall and heating by the beam, the temperature of the air introduced into the outer tube 104 is increased by an appropriate adjustment of valve 140, to maintain the wall of the beam guide tube at a higher temperature than that of the gas column. Because of the slow heating rate of the gas due to its high heat capacity at the operating pressure, the fraction of a degree difference between the temperature of the gas at the tube wall and tube center, required to overcome beam spreading and to guide the beam through curvatures of the tube, can be maintained for several hours of continuous operation.

As drilling progresses, new sections of the coaxial tube assembly are added to the tube string. To obtain access to the tube string, mirror 109 is retracted by rod 110 and spool 111 is disengaged from threaded joints 112 of tube 102 by rotating shaft 113. The spool 111 is then retracted into the short housing 114 by withdrawing shaft 113. The hot air supply valve 120 and throttle valve 122 are closed shutting off the flow of gas and air to the wellhead. Valve 130 is closed by rotation of screw actuator shaft 115 to seal the gas in the bore hole and the pressure in the portion of the wellhead 90 above valve 130 is relieved by opening relief valve 123 and venting the gas to the atmosphere through port 103. The housing 114 and retracted spool 111 are disconnected by rotating housing 114 to disengage interrupted threads 116 and the housing and spool assembly is then lifted away from the wellhead. The slow flow of clean gas into port 100 from orifice window 127 via metering valve 121 may be allowed to continue to avoid backflow into the orifice window and possible contamination.

Figure 12:
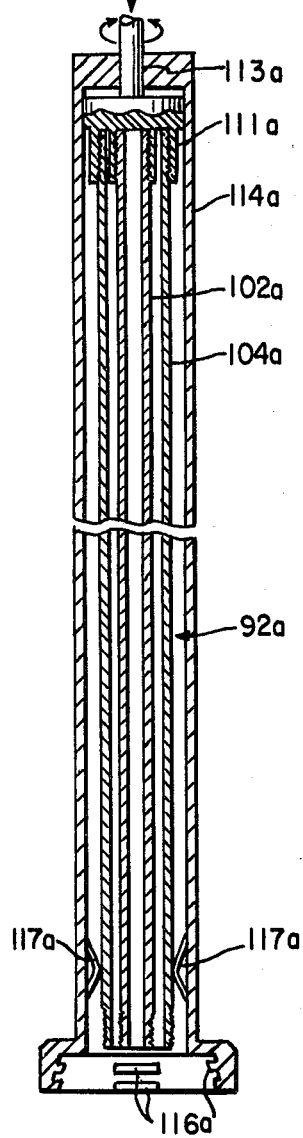
FIG. 12 is a sectional view of apparatus for installing new sections of the beam guide during the drilling operation.

To add a new section of coaxial tube, the section is first installed in a long housing assembly 114a shown in FIG. 12. The threaded spool 111a is moved by shaft 113a to the open end of housing 114a and the new coaxial tube section 92a is threaded into the spool 111a. The spool and the tube assembly 92a, which is centered in the housing 114a by spring guides 117a, is then retracted back to the position shown in FIG. 12. The loaded housing 114a is lowered onto the wellhead structure 90 and secured thereto by rotation of housing 114a so that interrupted threads 116a of the housing engage interrupted threads 116 on the base 93. Once secured to the wellhead structure, housing 114a is pressurized through port 103 by opening valve 120, gate valve 130 is then opened and the tube section is lowered and screwed onto the mating threads 112 of the upper section of the tube string in the bore hole. After the new section is secured to the tube string, sufficient upward pull is exerted on shaft 113a to support the entire string of tube sections, rams 107 are withdrawn and the string is lowered by shaft 113a until the new tube section 92a is in the position previously occupied by tube section 92. The rams 107 are then closed to clamp and support the string, shaft 113a is rotated to disengage spool 111a from new section 92a and the spool is withdrawn by shaft 113a to a position back inside of housing 114a. Gate valve 130 and air supply valve 120 are closed and relief valve 123 opened to depressurize the housing. The long housing 114a is then disengaged from interrupted thread 116 and removed from the wellhead.

To resume operation, the short housing 114 is reinstalled on the wellhead using the same sequence of operations. The mirror 109 is then extended into operating position and the beam guide 102 is purged and charged with a rapid flow of clean, cold gas via port 100, by opening purging valve 124 and return throttle valve 122. The flow into port 100 is then reduced to the metered rate required for beam guide operation by closing the purging valve 124. Hot air circulation is restored by opening supply valve 120 and the system is ready to resume drilling operation with the laser beam.

The coaxial tube configuration makes it possible to use a relatively large diameter tube for guiding the beam since the bulk of the drilling debris is removed by the air conveyed to the well bottom through the outer tube. Thus, it may be feasible to achieve the penetration rates and hole diameters shown in Table II by using a tube several inches in diameter to guide a correspondingly sized beam. The flow rate of the gas required to maintain laminar flow in a tube of such diameter is very low since the critical velocity above which turbulence occurs is inversely proportional to the tube diameter and therefore the amount of gas supplied to the well bottom may be well below the value required to remove the drilling debris. However, a beam several inches in diameter would be adequate to drill a hole of a size which could accommodate an outer tube of a diameter sufficient to supply the amount of air required to remove the debris. The coaxial tube configuration thus permits the use of a significantly larger beam guide tube and hence a larger drilling beam than would be possible in the case of a single beam guide tube in which the gas producing the guiding effect must also remove the debris produced by drilling.

In accordance with another embodiment of the invention hole diameters comparable to those drilled by a coaxial tube arrangement may be achieved without the need for periodic purging of the heated gas by using a cluster of smaller diameter tubes, each guiding a separate beam to the down-hole drilling site. The diameter of each tube may, for example, be about half an inch or less so that a relatively high gas flow rate can be maintained without exceeding the critical velocity. The multiple beam may be produced by driving the oscillator laser beam by well known beam splitting techniques and the beam then can be amplified by a single or by multiple laser amplifiers and passed to the high pressure region at the wellhead through a single orifice window. Because of the relatively high flow rate that can be maintained in the small diameter tubes, and the high heat capacity of the gas at high pressure, the total temperature rise of the gas column due to absorbtion of beam energy may be maintained sufficiently low to permit continuous operation at depths of several thousand feet.

As in the case of the coaxial beamguide tube, the required temperature distribution may be established by introducing a cold gas into the beamguide tubes. Moreover, as discussed earlier, at laminar flow the transverse velocity distribution is substantially parabolic and therefore the slower flowing gas at the tube periphery is exposed to heating by the beam for longer periods than the faster flowing gas at the center. Hence, in the case of multi-kilowatt beams, even if the initial temperature of the gas were about the same as that of the tube, the required temperature profile would be established by the nonuniform heating due to absorbtion of energy from the beam. Once established, the desired temperature distribution is maintained during operation by the interaction of the beam with the gaseous medium because the beam density profile tends to assume substantially the same distribution as that of the index of refraction. Hence as a result of the radially decreasing index of refraction distribution produced by the temperature distribution, more of the beam energy is concentrated along the tube axis increasing the heating rate of the cooler gas at the center. As the temperature of the gas along the tube axis rises, the beam rays bend toward the adjacent cooler gas and the power density at the center decreases while that in the adjacent region increases. In this manner at high beam powers negative feedback is produced in the beamguide tube which drives it toward the optimum amount of refraction for transmission of the beam and accommodation of tube curvature.

Furthermore, the beamguide can be formed in situ by having the gas in the well bore at a lower temperature than that of the ambient rock. As the cold gas enters the bore hole the outer layer is rapidly heated by the surrounding rock to a higher temperature than that of the gas along the center producing the radially decreasing transverse index of refraction distribution required for guiding a beam projected into the well to the down-hole drilling site. Calculations such as those set forth above indicate that, for example, in an approximately one inch diameter bore hole and with an initial temperature of the gas about 100° F. lower than the temperature of ambient rock, the desired temperature gradient across the gas column may be maintained for several hours at pressures of about two hundred atmospheres. As in the case of the beamguide tube, the heated gas may perodically be purged from the well by a high velocity charge of fresh cold gas to maintain the temperature profile during operation.

The drilling debris may be disposed of by maintaining the pressure of the gas at sufficiently high level to force the molten rock and vapors into the formation through fissures produced in the rock by thermal stresses and expanded into larger cracks by the flow of high pressure gas. The path of the beam is thus maintained substantially free from energy attenuating contaminants by the flow of high pressure gas which forces the debris back into the surrounding rock.

Fracing Apparatus

Figure 13:
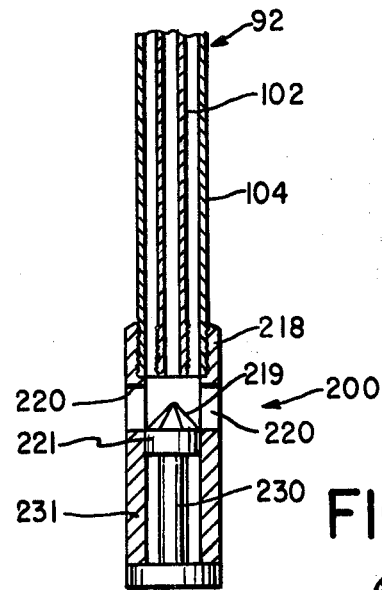
FIG. 13 is a sectional view of apparatus including laser drilling apparatus of the invention for "fracing" the pay zone of a well.

In addition to drilling a well bore, the apparatus shown in FIGS. 10 and 11 may also be used for fracing the pay zone of either existing wells in order to increase recovery of oil or gas or the pay zone of a new well drilled through a low permeability rock. This may be accomplished by attaching to the lower end of a section of the coaxial tube assembly, described with respect to the embodiment of FIG. 10, a fracturing tool shown in FIG. 13. The fracturing tool 200 includes a cylindrical housing 218 threaded onto the lower end of the outer tube 104 with a multi-faceted pyramidal reflector 219 mounted on its base 221 at a position directly below the lower end of the beam guide tube 102 and in the path of the emergent beam. The facets of the reflector 219 are arranged to divide the incident beam into a plurality of transverse secondary beams and to direct them through apertures 220 formed through the wall of housing 218. The reflector is cooled by the flow of cold gas from the beamguide tube 102. A metal cylinder 230 extending from the lower surface of base 221 serves as a heat pipe to conduct the heat from the reflector to the elongated member 231 attached to the bottom of housing 218. Member 231 radiates the heat to the relatively cool walls of the bore hole to provide additional cooling.

Figure 14:
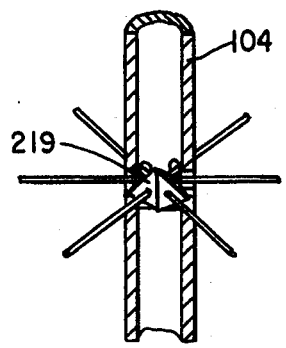
FIG. 14 is a sectional view of a well bore illustrating the "fracing" of a pay zone by the tool of the invention.

In operation, the coaxial tube assembly with the fracturing tool 200 attached to its lower end, is lowered into the bore hole by adding tube sections to the tube string until the fracing tool is positioned at the desired point at the pay zone. Upon activation of the apparatus, the laser beam is guided along tube 102 and impinges on reflector 219. As shown in FIG. 14, the reflector divides the incident beam into a plurality of lateral beams which impinges on and drill lateral holes through the pay zone by melting or vaporizing the rock in their paths.

As the laser beams drill through the formation, the intense heat produces thermal stresses in the rock which in turn produce fractures in the strata surrounding the lateral holes. The high pressure gas and air discharging from the lower end of the tube string flows into the lateral holes and expands the fractures initiated by thermal stress into cracks of sufficient size to accommodate the drilling debris. The vapors and molten rock produced during drilling are thus forced into the cracks radiating from the lateral holes by the high pressure gas so that the beam-path is maintained substantially transparent to the incident energy. As the molten rock forced into the cracks solidifies, it forms proppants which keep the cracks open despite the overburden pressure and increase the permeability of the pay zone.

When the penetration progresses to the nominal diffraction or thermal blooming limit, a high velocity charge of cold gas is injected into the well through the gas tube. As the cold gas enters the lateral holes, the layer of gas adjacent the hot sides of the hole is rapidly heated through thermal conduction producing the transverse thermal gradient required to guide the beam. Thus, the cold gas and the hot bore walls form a beam guide in each of the lateral holes extending the depth of penetration well beyond the nominal diffraction limit.

The azimuth and elevation of the lateral holes may be controlled by adjusting the facets of the reflector to produce the desired hole pattern. The directions of fracing from the bore hole can thus be tailored to maximize recovery of oil or gas from the particular geological formation.

Since in the fracing operation the drilling debris are disposed of by forcing the molten rock and vapors back into the rock, the gas may be supplied to the well at much slower rate than in well drilling. Hence, the construction of the system may be simplified by using a single beamguide tube rather than the coaxial structure shown in FIG. 13. Moreover, a reflector having a single planar surface arranged to direct the vertical beam laterally against the strata surrounding the well bore may be used instead of the multifaceted reflector shown in FIG. 13. Since in such an arrangement, a single beam is employed to drill through the pay zone, higher penetration rates and larger holes may be achieved for a given laser output power.

While the invention has hereinabove been set forth in terms of a number of presently preferred exemplary embodiments, the invention is not limited thereto, but rather comprehends all modifications on and departures from these embodiments properly falling within the scope of the appended claims.

I claim:

1. A method of drilling through a subterraneous formation by a laser beam of sufficient energy to penetrate through the formation by melting or vaporizing the material in its path comprising:
   a. introducing under pressure a gas which is substantially transparent to the laser beam into a bore extending through such formation;
   b. directing the beam through the pressurized gas to the surface to be drilled; and
   c. guiding and confining the beam passing through the pressurized gas over a substantial portion of the beam path along the bore to overcome effects of beam spreading so that adequate energy density is delivered at said surface to at least melt the material thereat.

2. A method according to claim 1 wherein the step of guiding includes cooling the gas to a significantly lower temperature than that of the formation surrounding the well bore prior to introducing the gas into the bore so that when introduced the gas at the bore periphery is heated by the surrounding formation to a higher temperature than that of the gas at the bore center, thereby producing a radially decreasing index of refraction distribution in the gas which confines and guides the laser beam passing therethrough and wherein the pressure of the gas is sufficiently high to force debris produced by drilling into the formation at such surface.

3. A method according to claim 1, including inserting a tubular member into the bore with one end thereof positioned generally at such surface, and wherein the pressurized gas is introduced and the beam is directed into the other end of the tubular member.

4. A method of drilling through a subterraneous formation by a laser beam of sufficient energy to penetrate through the formation by melting or vaporizing the material in its path comprising:
   a. inserting a tubular member into a bore extending through such formation with one end of the tubular member positioned generally at the surface to be drilled;
   b. introducing under pressure into the other end of the tubular member a gas which is substantially transparent to the laser beam;
   c. directing the beam through the pressurized gas to the surface to be drilled; and
   d. producing a radially increasing thermal distribution of the pressurized gas in the tubular member thereby establishing a radially decreasing transverse index of refraction distribution which confines the beam passing therethrough.

5. A method according to claim 4, wherein the step of producing the thermal distribution includes cooling the gas to a lower temperature than the temperature of the wall of the tubular member prior to introducing the gas into the tubular member so that when introduced, the layer of gas adjacent the wall is heated to a higher temperature than that of the gas at the center of the tubular member.

6. A method according to claim 5, wherein the gas is introduced into the tubular member at a sufficiently low rate to maintain laminar gas flow.

7. A method according to claim 6, including heating the wall of the tubular member.

8. A method according to claim 7, wherein the wall is heated by a flow of hot gas introduced into an annular space between the tubular member and an outer tube concentric with and surrounding the tubular member.

9. A method according to claim 4, wherein the step of directing includes positioning a reflector in the bore adjacent said one end of the tubular member and in the path of the beam to deflect the incident beam laterally against such surface at the side of the bore to drill a lateral hole therethrough.

10. A method according to claim 9, wherein the pressure of the gas is sufficient to force debris produced by drilling into the formation at such surface.

11. Apparatus for drilling a bore hole through a subterranean formation comprising:
    a. means for generating a radiant beam of sufficient energy to penetrate through such formation by melting or vaporizing the material in its path;
    b. a tubular member extending into the formation to a point generally at the surface to be drilled;
    c. means for directing the beam through said tubular member to progressively penetrate through the formation at such surface; and
    d. means for producing a fluid flow said tubular member in the path traversed by the beam for maintaining the beam path therethrough substantially free from energy-dissipating contaminants.

12. Apparatus according to claim 11, wherein said beam generating means is a laser and said fluid is a pressurized gas.

13. Apparatus according to claim 12, including pressure window means for passing said laser beam into said pressurized gas.

14. Apparatus according to claim 13, wherein said window means includes a chamber in fluid communication with said pressurized gas, said chamber having a small diameter orifice communicating with a region of lower gas pressure outside said chamber, means disposed in said low pressure region for converging said laser beam to a spot at said orifice of a sufficiently small size to pass the beam through said orifice and into said chamber, and means disposed in said chamber for collimating the beam emerging from said orifice.

15. Apparatus according to claim 14, including a housing disposed at the surface of the formation above said bore hole, said housing having a pressurized interior cavity into which the upper end of said tubular member extends, conduit means for conducting the beam from said chamber into said cavity, and wherein said directing means includes reflector means disposed in said cavity for deflecting the beam into said tubular member.

16. Apparatus according to claim 13, including means for guiding and confining the beam passing through said tubular member.

17. Apparatus according to claim 16, wherein said guiding means includes means for producing a radially increasing temperature distribution across said pressurized gas in said tubular member thereby creating a radially decreasing transverse index of refraction distribution such that the beam is confined and guided along the axis of said tubular member.

18. Apparatus according to claim 17, wherein said gas flow is sufficiently low to maintain laminar flow in said tubular member.

19. Apparatus according to claim 18, further including an outer tube concentric with and surrounding said tubular member, and means for introducing into an annular space between said outer tube and said tubular member hot gas for heating the wall of said tubular member.

20. Apparatus according to claim 19, wherein the hot gas is introduced at a sufficient rate to remove debris produced during drilling by carrying the entrained debris to the surface through an annular space between said outer tube and the sides of a bore hole through which it extends.

21. Apparatus for fracing a subterranean pay zone of a well to increase the recovery of minerals or energy therefrom by drilling through the pay zone formation comprising:
 a. a laser for generating a beam of sufficient energy to penetrate through such formation by melting or vaporizing the material in its path;
 b. a tubular member extending into the formation to a point generally in the area to be drilled;
 c. means for directing the beam through said tubular member;
 d. means for producing a pressurized gas flow down said tubular member in the path traversed by the beam for maintaining the beam path therethrough substantially free from energy-dissipating contaminants; and
 e. reflector means disposed below the lower end of said tubular member and in the path of said beam for directing the incident beam laterally against the surrounding formation.

22. Apparatus according to claim 21, including pressure window means for passing said laser beam into the pressurized gas.

23. Apparatus according to claim 22, including means for guiding the beam passing through said tubular member.

24. Apparatus according to claim 23, wherein said gas is at a pressure sufficient to force debris produced by drilling into the surrounding formation.

25. Apparatus according to claim 24, wherein said reflector means includes a plurality of reflective surfaces arranged to divide the incident beam into a plurality of lateral beams.

26. A pressure window for passing a radiant beam between two regions of different gas pressures comprising a gas-impervious partition separating the two regions of different pressures, said partition having a small diameter orifice formed therethrough, means disposed on one side of said partition for converging the radiant beam to a spot at said orifice of a sufficiently small size to pass the beam through said orifice into the region on the other side of said partition, and means disposed on said other side of said partition for collimating the divergent beam emerging from said orifice.

27. A pressure window for passing a radiant beam between two regions of different gas pressures comprising a gas-impervious partition separating the two regions of different pressures, said partition having a small diameter orifice formed therethrough, said partition further having on at least one side thereof a generally conical inner surface surrounding said orifice, means disposed on said one side of said partition for focusing the radiant beam to pass through said orifice into the region on the other side of said partition, and means disposed on said other side of said partition for collimating the divergent beam emerging from said orifice.

28. A window according to claim 27, wherein said partition extending from said one side of the orifice forms a chamber communicating with the gas in one of said regions through a conduit which is capable of passing the beam from said one region into said chamber.

29. A window according to claim 28, comprising a second chamber having a wall extending from and surrounding the other side of said orifice.

30. A window according to claim 29, wherein said wall of said second chamber extending from said orifice has a generally conical cross-section.

31. A window according to claim 30 including means for introducing a coaxial gas flow around the gas flowing from said orifice to limit its expansion in the region adjacent said orifice.

32. A pressure window for passing a radiant beam between two regions of different gas pressures comprising a gas-impervious partition separating the two regions of different pressures, said partition having a small diameter orifice formed therethrough, means disposed on one side of said partition for focusing the radiant beam to pass through said orifice into the region on the other side of said partition, means disposed on said other side of said partition for collimating the divergent beam emerging from said orifice and means for increasing the pressure of the gas in the region of said orifice to prevent gas breakdown.

33. A window according to claim 32, wherein said means for increasing the pressure includes means for introducing additional gas under pressure into said region.

34. A window according to claim 33, further including means for sensing the pressure of the gas in said region and means responsive to said sensing means for regulating the pressure of the gas introduced into said region so that the pressure therein is maintained at a level required to prevent gas breakdown.

35. A method of drilling through a subterranean formation by a radiant beam of sufficient energy to penetrate through the formation by melting or vaporizing the material in its path comprising:
 a. directing the beam into a bore extending through the formation to the surface to be drilled;
 b. introducing into the bore a gas which is substantially transparent to the beam at a pressure sufficient to force debris produced by drilling into the formation at said surface and maintain the path of the beam passing through the bore substantially free from beam-degrading contaminants; and
 c. producing a radially increasing temperature distribution across the pressurized gas in the bore to establish a radially decreasing transverse index of refraction distribution for confining the beam passing therethrough along the axis of the bore so that adequate energy density is delivered to said surface to at least melt the material thereat.

36. A method according to claim 35 wherein the gas introduced into the bore is at a lower temperature than the temperature of the formation at the side of the bore and wherein said temperature distribution is produced by the gas adjacent the bore periphery being heated to a higher temperature by said formation than the temperature of the gas at the bore center.

37. A method according to claim 36 including the steps of periodically discharging the gas from the bore and reintroducing into the bore gas at said lower temperature at sufficiently frequent intervals during the drilling operation to prevent the gas from reaching a uniform temperature distribution across the bore.

38. Apparatus for drilling a bore hole through a subterranean formation comprising:

a. means for generating a radiant beam of sufficient energy to penetrate through such formation by melting or vaporizing the material in its path;
b. a tubular member extending into the formation to a point generally at the surface to be drilled;
c. means for directing the beam through said tubular member to progressively penetrate through the formation at such surface;
d. means for producing a flow of gas under pressure along said tubular member in the path of the beam for maintaining the beam path therethrough substantially free from energy-dissipating contaminants; and
e. pressure window means for passing said beam into said pressurized gas.

* * * * *